(12) United States Patent
Nara et al.

(10) Patent No.: US 9,316,487 B2
(45) Date of Patent: Apr. 19, 2016

(54) LASER TRACKING INTERFEROMETER

(71) Applicant: MITUTOYO CORPORATION, Kanagawa (JP)

(72) Inventors: Masayuki Nara, Ibaraki-ken (JP); Shinichiro Yanaka, Ibaraki-ken (JP)

(73) Assignee: MITUTOYO CORPORATION, Kanagawa (JP)

( * ) Notice: Subject to any disclaimer, the term of this patent is extended or adjusted under 35 U.S.C. 154(b) by 36 days.

(21) Appl. No.: 14/280,743

(22) Filed: May 19, 2014

(65) Prior Publication Data

US 2014/0347673 A1    Nov. 27, 2014

(30) Foreign Application Priority Data

May 24, 2013  (JP) .................................. 2013-109550

(51) Int. Cl.
G01B 11/02   (2006.01)
G01B 11/14   (2006.01)
G01B 11/00   (2006.01)

(52) U.S. Cl.
CPC .............. *G01B 11/14* (2013.01); *G01B 11/002* (2013.01)

(58) Field of Classification Search
CPC ....................................... G01B 11/14
USPC .......................................... 356/498, 493, 486
See application file for complete search history.

(56) References Cited

U.S. PATENT DOCUMENTS

| | | | |
|---|---|---|---|
| 6,147,748 A | 11/2000 | Hughes | |
| 2007/0024861 A1* | 2/2007 | Yanaka et al. | 356/498 |
| 2008/0049211 A1* | 2/2008 | Ueshima et al. | 356/4.09 |
| 2008/0316497 A1* | 12/2008 | Taketomi et al. | 356/498 |

FOREIGN PATENT DOCUMENTS

| | | |
|---|---|---|
| JP | H07-190714 A | 7/1995 |
| JP | 2603429 B | 1/1997 |
| JP | 4776454 B | 7/2011 |

* cited by examiner

*Primary Examiner* — Jonathan Hansen
(74) *Attorney, Agent, or Firm* — Greenblum & Bernstein, P.L.C.

(57) ABSTRACT

A laser tracking interferometer has a carriage provided with a first displacement gauge outputting a displacement signal associated with a relative displacement from a reference sphere; a second retroreflector provided to the carriage; a laser interferometer provided to the carriage and outputting a displacement signal associated with a relative displacement between the first retroreflector and the second retroreflector; and a data processor calculating a displacement of the first retroreflector with reference to the reference sphere based on the displacement signal output from the first displacement gauge and the displacement signal output from the laser interferometer.

19 Claims, 7 Drawing Sheets

LASER TRACKING INTERFEROMETER

CROSS-REFERENCE TO RELATED APPLICATIONS

The present application claims priority under 35 U.S.C. §119 of Japanese Application No. 2013-109550 filed on May 24, 2013, the disclosure of which is expressly incorporated by reference herein in its entirety.

BACKGROUND OF THE INVENTION

1. Field of the Invention

The present invention relates to a laser tracking interferometer.

2. Description of Related Art

A fixed-datum type laser tracking interferometer is known (refer to U.S. Pat. No. 6,147,748, Japanese Patent No. 2603429, and Japanese Patent No. 4776454, for example), in which a first retroreflector as a measured body is attached at a front end of a Z axis or the like of a three-dimensional measuring apparatus and a laser beam is emitted toward the first retroreflector. Interference of the laser beam reflected by the first retroreflector in a return direction (direction opposite to emission) is used to measure a change in a distance from the center of a reference sphere, which is a reference point of measurement, to the first retroreflector. Tracking is also performed based on a change in a position of an optical axis of the laser beam.

Furthermore, a laser interferometer is known which measures a change in a distance between two points opposite to each other with the interferometer therebetween (refer to Japanese Patent Laid-Open Publication No. H7-190714, for example).

FIG. 1 is a schematic configuration of a main portion of a laser tracking interferometer disclosed in Japanese Patent No. 4776454. In a device illustrated in FIG. 1, a first retroreflector 105 as a measured body is attached at a front end of a Z axis or the like of a three-dimensional measuring apparatus. The device tracks the first retroreflector 105 moving in space and measures in a highly accurate manner an amount of change $\Delta L$ in a distance L from a center point C of a reference sphere 101 to the first retroreflector 105, the reference sphere 101 having excellent sphericity and being fixed in space.

The reference sphere 101 is produced such that a radius thereof is identical around an entire surface in a highly accurate manner. Thus, the amount of change $\Delta L$ in the distance L can be obtained from an amount of change $\Delta L_2$ and an amount of change $\Delta L_1$ as shown below, the amount of change $\Delta L_2$ being measured by a displacement gauge 103 fixated onto a carriage 102 rotating around the point C, the amount of change $\Delta L_1$ being measured by a laser interferometer 104 similarly fixated onto the carriage 102.

$$\Delta L = \Delta L_1 + \Delta L_2$$

The amount of change $\Delta L_2$ represents an amount of change in a distance $L_2$ from the surface of the reference sphere 101 to a reference point $P_2$ of displacement measurement of the displacement gauge 103. The amount of change $\Delta L_1$ represents an amount of change in a distance $L_1$ from a reference point $P_1$ of displacement measurement of the laser interferometer 104 to the first retroreflector 105.

A situation is assumed herein where, for example, a general Michelson interferometer is used as the laser interferometer 104, which is fixated to the carriage 102 at a connection point P on the carriage 102.

In a state where the first retroreflector 105 stands still without moving in space, when a housing of the laser interferometer 104 undergoes thermal expansion due to a change in surrounding temperature or the like, an amount of change $\Delta L_4$ is generated in a distance $L_4$ from the connection point P to the reference point $P_1$, and thus the distance $L_4$ from the connection point P to the reference point $P_1$ increases by the amount of change $\Delta L_4$. As a result, even though the first retroreflector 105 stands still and the distance $L_1$ from the reference point $P_1$ to the first retroreflector 105 is not supposed to change, the distance $L_1$ is measured shorter by the amount of change $\Delta L_4$ since a position of the reference point $P_1$ of the laser interferometer 104 is pushed out and changed. Thus, when the housing of the laser interferometer 104 undergoes thermal expansion due to a change in surrounding temperature or the like, a problem arises where an error occurs in a measurement value of the amount of change $\Delta L$.

Similarly, when the carriage 102 undergoes thermal expansion due to a change in surrounding temperature or the like, an amount of change $\Delta L_3$ is generated in a distance $L_3$ from the connection point P to the reference point $P_2$ of displacement measurement of the displacement gauge 103, and thus the distance $L_3$ from the connection point P to the reference point $P_2$ increases by the amount of change $\Delta L_3$. As a result, even though the first retroreflector 105 stands still and the distance $L_2$ from the reference point $P_2$ to the reference sphere 101 is not supposed to change, the distance $L_2$ is measured shorter by the amount of change $\Delta L_3$ since a position of the reference point $P_2$ of the displacement gauge 103 is pushed out and changed. Thus, when the carriage 102 undergoes thermal expansion due to a change in surrounding temperature or the like, a problem arises where an error occurs in a measurement value of the amount of change $\Delta L$.

SUMMARY OF THE INVENTION

In view of the above conventional circumstances, a primary advantage of the present disclosure provides a laser tracking interferometer capable of measuring an amount of change in a distance in a highly accurate manner even when a housing of a laser interferometer undergoes thermal expansion in the laser tracking interferometer. A secondary advantage of the present disclosure provides a laser tracking interferometer capable of measuring an amount of change in a distance in a highly accurate manner even when a carriage undergoes thermal expansion in the laser tracking interferometer.

An aspect of the present disclosure provides a laser tracking interferometer detecting a displacement of a first retroreflector by utilizing interference of a laser beam emitted toward the first retroreflector as a measured body and reflected by the first retroreflector in a return direction, the laser tracking interferometer performing tracking by using a positional change of an optical axis of the laser beam. The laser tracking interferometer includes a reference sphere provided fixedly; a carriage provided with a first displacement gauge outputting a displacement signal associated with a relative displacement from the reference sphere; a second retroreflector provided to the carriage; a laser interferometer outputting a displacement signal associated with a relative displacement between the first retroreflector and the second retroreflector; and a data processor calculating a displacement of the first retroreflector with reference to the reference sphere based on the displacement signal output from the first displacement gauge and the displacement signal output from the laser interferometer.

The laser tracking interferometer may further include a displacement measurer provided to the carriage and measuring an amount of change in a distance between the first displacement gauge and the second retroreflector. The data processor may calculate a displacement of the first retroreflector with reference to the reference sphere based on the displacement signal output from the first displacement gauge, the displacement signal output from the laser interferometer, and the amount of change measured by the displacement measurer.

The displacement measurer may include a target and a second displacement gauge positioned from the target with a distance between the first displacement gauge and the second retroreflector, the second displacement gauge outputting a displacement signal associated with a relative displacement from the target.

The displacement measurer may further include a third displacement gauge positioned between the first displacement gauge and the second retroreflector, the third displacement gauge outputting a displacement signal associated with a relative displacement from the second retroreflector.

The displacement measurer may further include a holder positioned so as to cover a front surface of the second retroreflector.

The laser tracking interferometer may further include a fourth displacement gauge provided to the carriage at a position opposite to the first displacement gauge with the reference sphere therebetween, the fourth displacement gauge outputting a displacement signal associated with a relative displacement from the reference sphere. The data processor may calculate a displacement of the first retroreflector with reference to the reference sphere based on the displacement signal output from the first displacement gauge, the displacement signal output from the laser interferometer, and the displacement signal output from the fourth displacement gauge.

The laser tracking interferometer may further include a position detector outputting a position signal associated with an amount of misalignment of the laser beam reflected by the first retroreflector and returning to the laser interferometer when the laser beam is misaligned in a direction orthogonal to the optical axis thereof; and a controller controlling, based on the position signal from the position detector, rotation of the carriage such that the amount of misalignment is zero.

According to the present disclosure, the amount of change in the distance can be measured in a highly accurate manner even when the housing of the laser interferometer undergoes thermal expansion. Furthermore, the amount of change in the distance in a highly accurate manner even when the carriage undergoes thermal expansion.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Preferred embodiments of the present invention are described below with reference to the attached drawings. However, the present invention is not limited to the preferred embodiments below. Furthermore, the descriptions and drawings below are simplified as appropriate for clarification purposes.

First Embodiment

Figure 1:
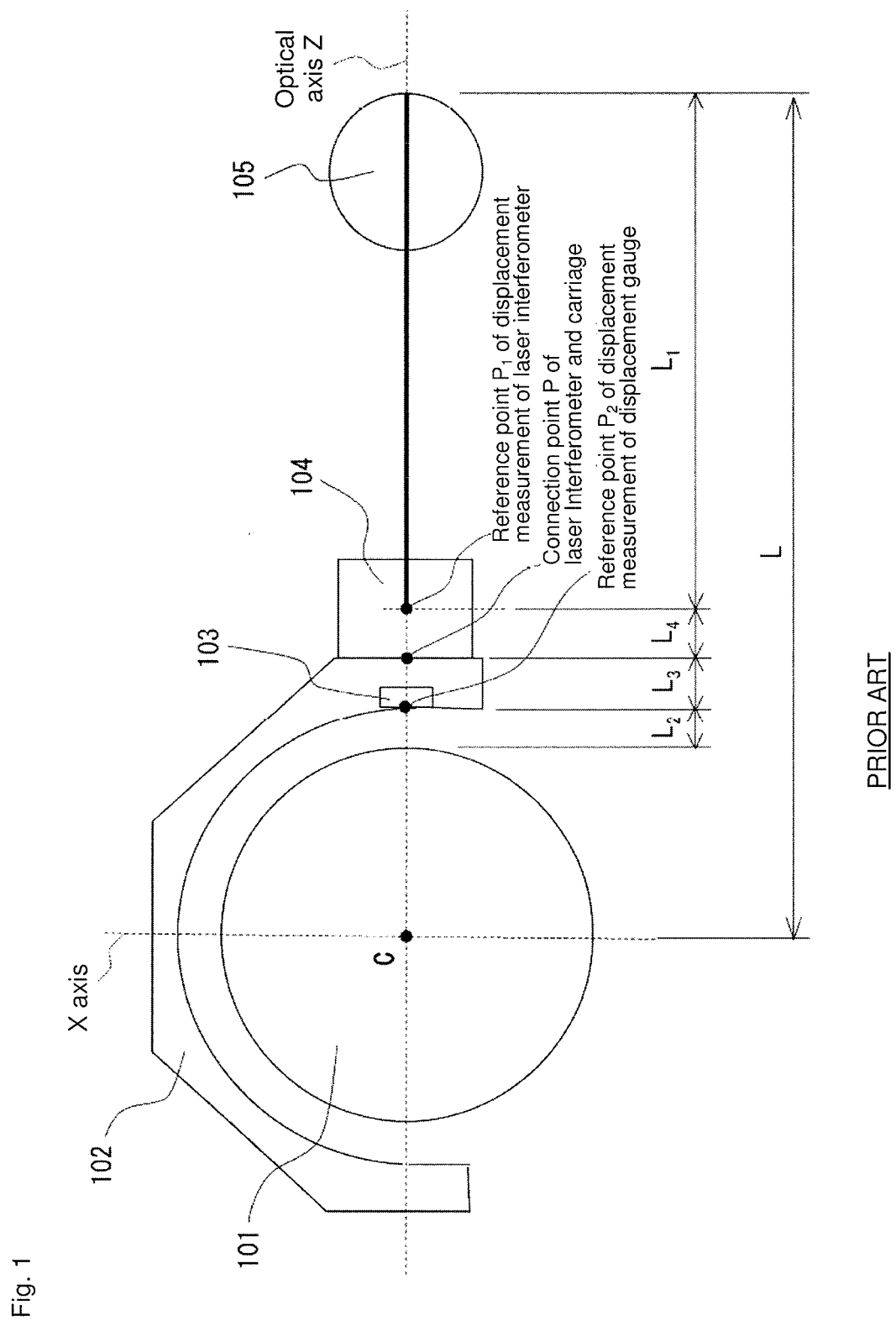
FIG. 1 is a schematic configuration diagram of a main portion of a conventional laser tracking interferometer.
Figure 2:
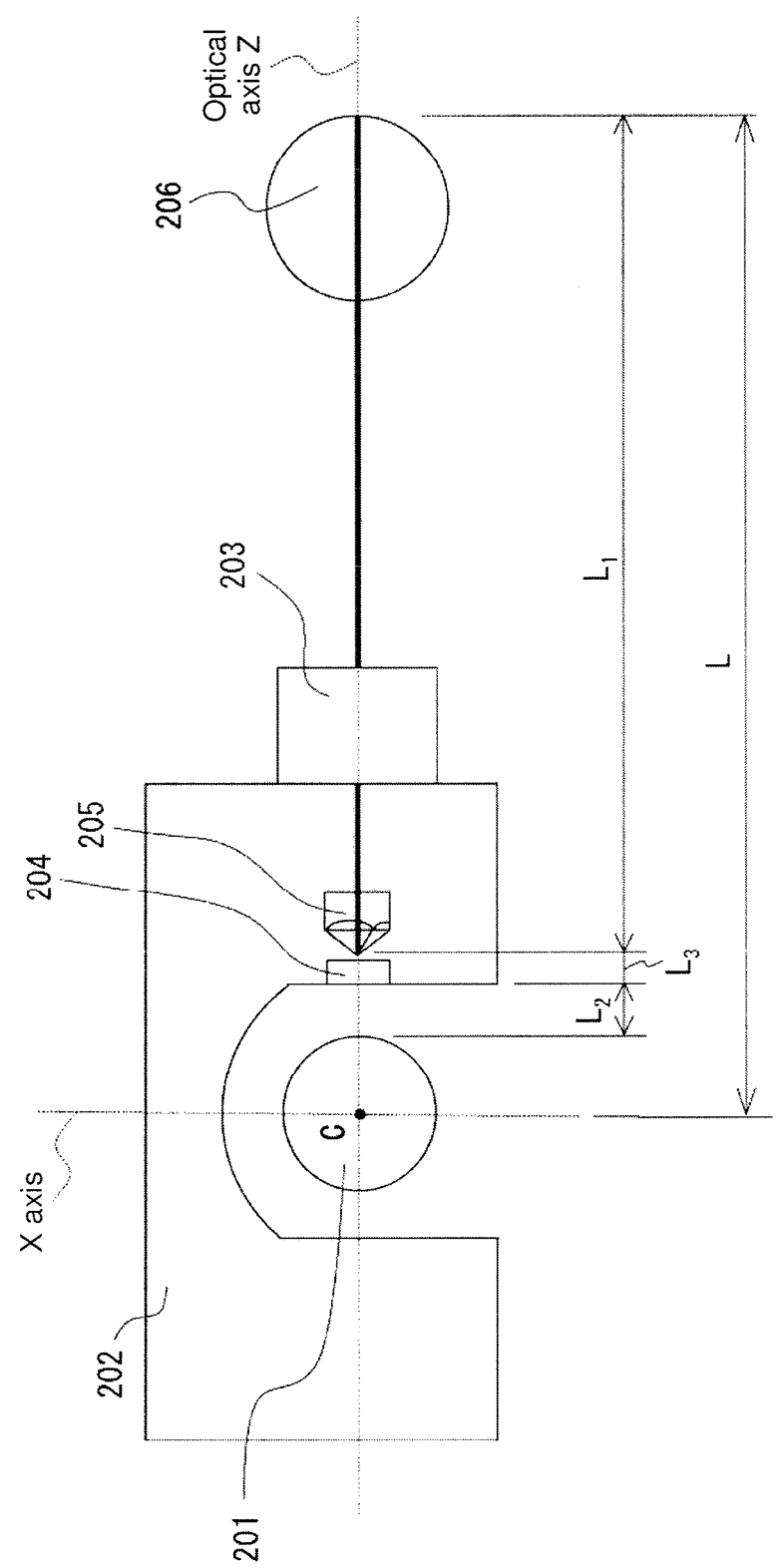
FIG. 2 is a schematic diagram illustrating a configuration of a main portion of a laser tracking interferometer according to a first embodiment of the present disclosure.
Figure 3:
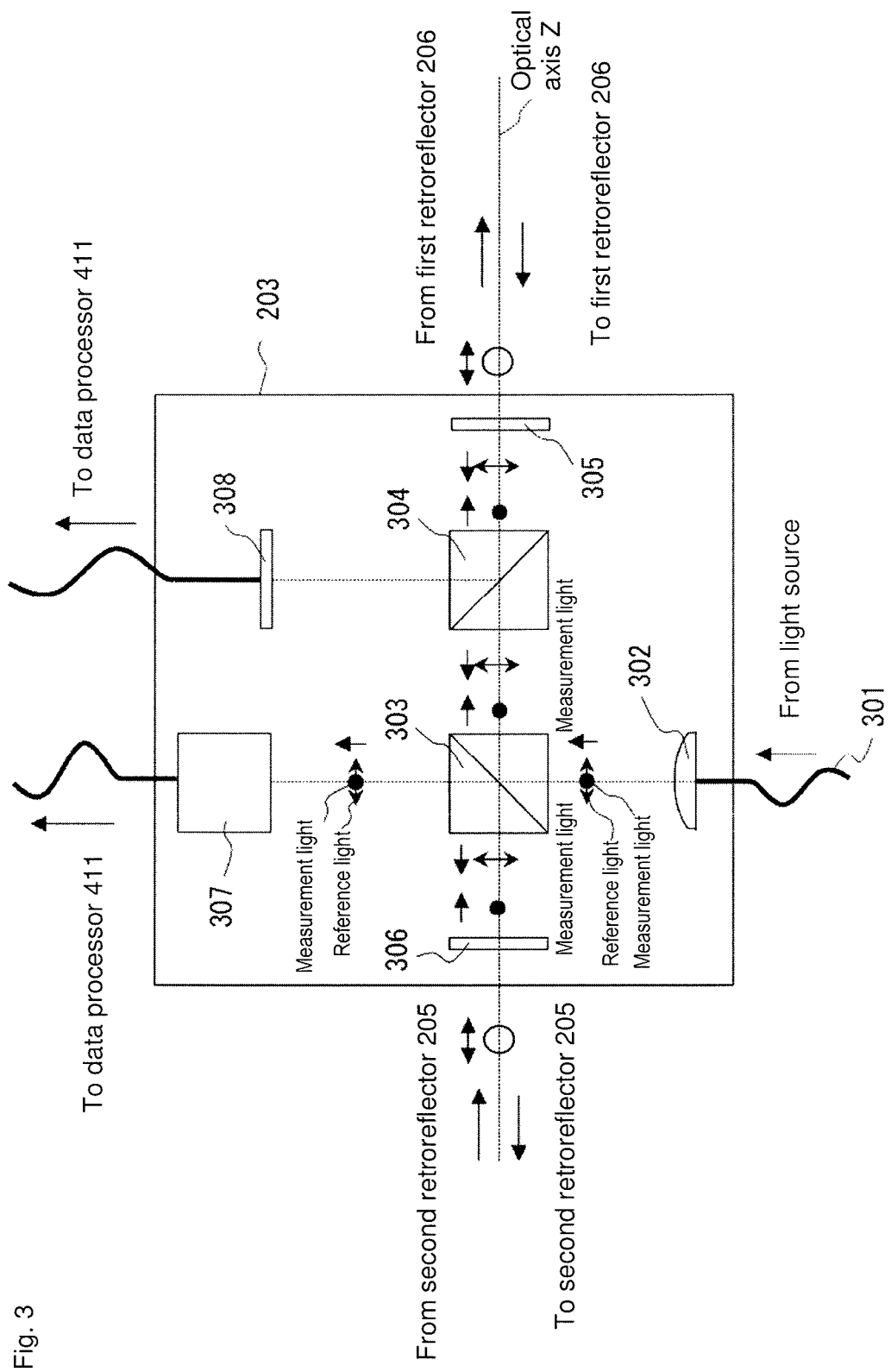
FIG. 3 is a schematic diagram illustrating an internal configuration of the laser tracking interferometer according to the first embodiment of the present disclosure.
Figure 4:
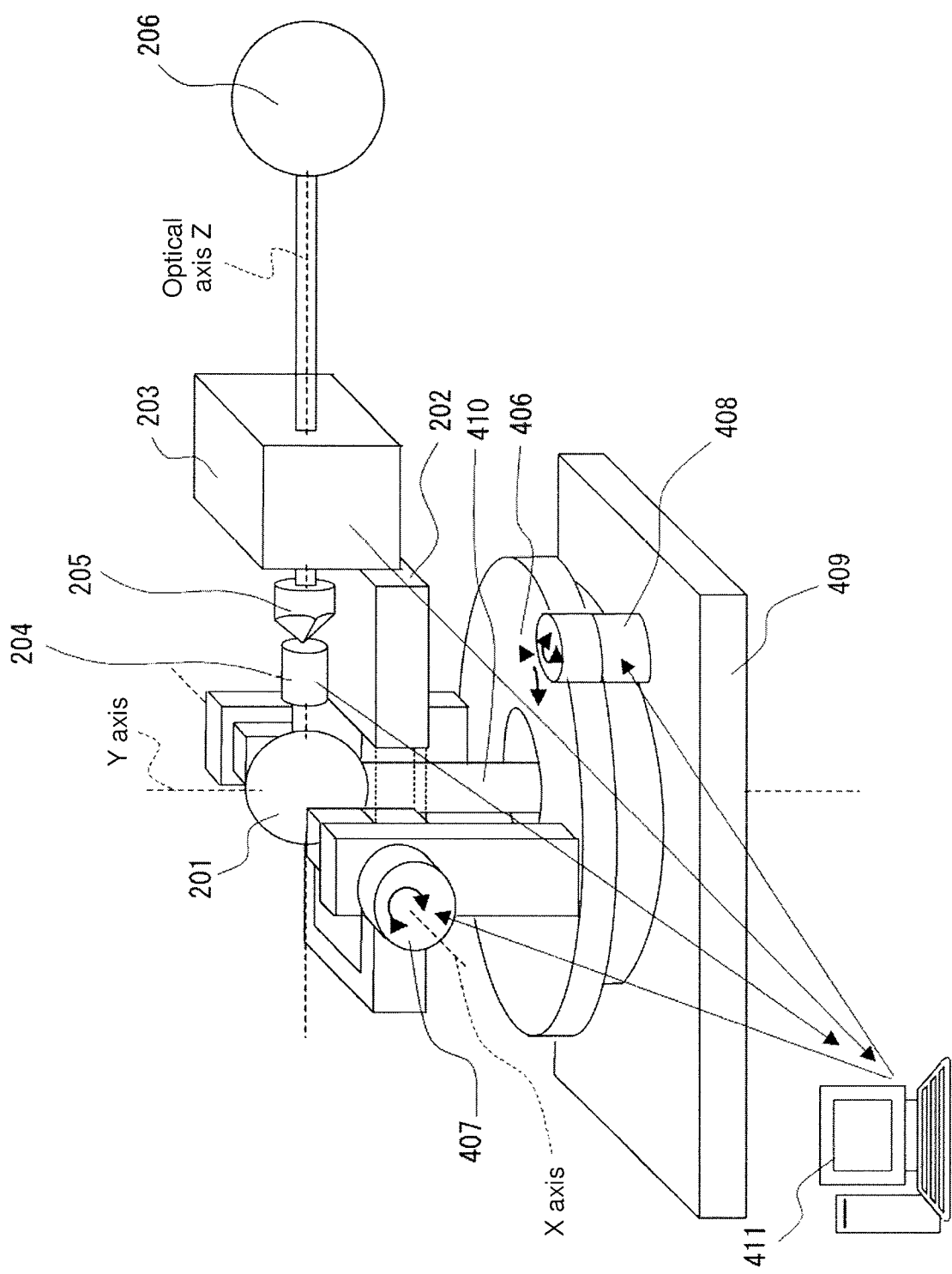
FIG. 4 is a perspective view illustrating an overall configuration of the laser tracking interferometer according to the first embodiment of the present disclosure.

A first embodiment of the present disclosure is described with reference to FIGS. 2 to 4. FIG. 2 is a schematic diagram illustrating a configuration of a main portion of a laser tracking interferometer according to the present embodiment. FIG. 3 is a schematic diagram illustrating an internal configuration of the laser tracking interferometer according to the present embodiment. FIG. 4 is a perspective view illustrating an overall configuration of the laser tracking interferometer according to the present embodiment.

In the present embodiment shown in FIGS. 2 to 4, a first retroreflector 206 as a measured body is attached at a front end portion of a Z axis or the like of a three-dimensional measuring apparatus. A laser tacking interferometer 203 is used to track the moving first retroreflector 206, and concurrently measure an amount of change $\Delta L$ in a distance L from a center point C of a reference sphere 201 to the first retroreflector 206, the reference sphere 201 having excellent sphericity and being fixed in place (i.e., fixed in space and without moving). Conventional configuration components are described in detail in U.S. Pat. No. 6,147,748 and Japanese Patent Laid-Open Publication No. H7-190714, for example, both disclosures of which are expressly incorporated by reference herein in their entireties, and thus descriptions thereof are omitted below. Functions of the components above and changes from the conventional configuration components are described.

With reference to FIGS. 2 to 4, the laser tracking interferometer of the present embodiment has the reference sphere 201. The reference sphere 201 is attached to a base plate 409 via a holder 410. A support frame 406 is provided on the base plate 409. A carriage 202 is rotatably attached to the support frame 406. The support frame 406 is rotated in an azimuthal direction around the center C of the reference sphere 201

(rotational direction around a Y axis of FIG. 4) by an azimuth angle rotation motor 408 provided on the base plate 409. Furthermore, an elevation angle rotation motor 407 is provided to the support frame 406. Rotary drive of the elevation angle rotation motor 407 rotates the carriage 202 in an elevation direction (rotational direction around an X axis of FIGS. 2 and 4). The elevation angle rotation motor 407 and the azimuth angle rotation motor 408 are connected to a data processor 411, which controls rotation of the carriage 202. The carriage 202 has a laser interferometer 203 that emits a measurement light (laser beam). The laser beam is emitted along the Z axis as an optical axis direction orthogonal to X and Y axes. Furthermore, a first displacement gauge 204 is provided to the carriage 202 between the reference sphere 201 and the laser interferometer 203 along the same axis as the laser beam. A second retroreflector 205 is provided on the carriage 202 between the first displacement gauge 204 and the laser interferometer 203 along the same axis as the laser beam. The first displacement gauge 204 and the laser interferometer 203 are connected to the data processor 411.

The optical axis Z directed from the laser interferometer 203 to the first retroreflector 206 rotates in conjunction with the rotation of the carriage 202 while tracking the first retroreflector 206. The center point C of the reference sphere 201, the first displacement gauge 204, the second retroreflector 205, and the laser interferometer 203 are all positioned along the optical axis Z.

The first displacement gauge 204 outputs a displacement signal associated with a relative displacement between the reference sphere 201 and the first displacement gauge 204. Specifically, the first displacement gauge 204 is used to measure an amount of change $\Delta L_2$ in a distance $L_2$ from a surface of the reference sphere 201 to the first displacement gauge 204 in association with the rotation of the carriage 202.

The laser interferometer 203 has a displacement detector (described later) and outputs a displacement signal associated with a relative displacement between the second retroreflector 205 and the first retroreflector 206, concurrently with the measurement of the amount of change $\Delta L_2$ in the distance $L_2$ by the first displacement gauge 204. Specifically, the laser interferometer 203 is used to measure an amount of change $\Delta L_1$ in a distance $L_1$ from the second retroreflector 205 to the first retroreflector 206.

The data processor 411 calculates a displacement of the first retroreflector 206 with reference to the reference sphere 201 based on the displacement signal output from the first displacement gauge 204 and the displacement signal output from the laser interferometer 203.

Furthermore, the laser interferometer 203 has a position detector (described later) and outputs a position signal associated with an amount of misalignment of the laser beam reflected by the first retroreflector 206 and returning to the laser interferometer 203 when the laser beam is misaligned in a direction orthogonal to the optical axis. The data processor 411 has a controller that controls the rotation of the carriage 202 based on a position signal from a two-dimensional PSD 308 such that the amount of misalignment is zero.

Each configuration component shown in FIG. 2 is described in more detail below. The reference sphere 201 can have, for example, a grade of G3 and a diameter of 5 to 25.4 mm. For the reference sphere 201, a sphere can include, as a material, a conductive quart, cordierite ceramics, or BK7, each of which is coated with a high carbon-chromium bearing steel, super invar, noble metal, or the like. The reference sphere 201 can be fixed in space by fixating it to the base plate 409 via the holder 410. The base plate 409 is formed of a super invar, cordierite ceramics, or aluminum alloy. The holder 410 is formed of a material having a small linear expansion coefficient, such as a super invar or cordierite ceramics, and has a rod or conical shape.

The carriage 202 is preferably formed of a material having a small linear expansion coefficient, such as a super invar or cordierite ceramics, in order to reduce an amount of change $\Delta L_3$ due to thermal expansion in a distance $L_3$ between the second retroreflector 205 and the first displacement gauge 204. However, the material of the carriage 202 is not limited to the above. The carriage 202 may be Ruined of a material, such as an aluminum alloy or carbon steel. Then, the second retroreflector 205 and the first displacement gauge 204 may be placed in the same holder including a material having a small linear expansion coefficient, and one end of the holder may be fixated to the carriage 202. In this case, although the linear expansion coefficient is larger than that of a super invar or the like, the material cost can be lower.

The laser interferometer 203 may have a housing formed of a material having a small linear expansion coefficient, such as a super invar or cordierite ceramics. In the present embodiment, the laser interferometer 203 can measure the amount of change $\Delta L$ without being affected by thermal expansion of the housing, as described later. Thus, the material of the laser interferometer 203 is not limited to the above. Although the linear expansion coefficient is larger than that of a super invar or the like, a lower-cost material, such as a carbon steel or aluminum alloy, may be used for the housing of the laser interferometer 203.

The first displacement gauge 204 can be a capacitance displacement gauge or an eddy current displacement gauge.

The second retroreflector 205 can be, for example, a quart corner cube prism, a hollow retroreflector, or a spherical retroreflector formed of a spherical glass having a refraction index of 2.0 and having a surface partially coated with a metal that reflects a laser. The second retroreflector 205 may be designed so as to be fixated to the carriage 202 via a holder formed of a material having a small linear expansion coefficient, such as a super invar. The second retroreflector 205 can be formed from a lower-cost material than the first retroreflector 206.

The first retroreflector 206 can be, for example, a hollow retroreflector, a hemisphere-combined retroreflector, or a spherical retroreflector formed of a spherical glass having a refraction index of 2.0 and having a surface partially coated with a metal that reflects a laser. The first retroreflector 206 may be attached to the front end portion of the Z axis or the like of the three-dimensional measuring apparatus (measured body) via a holder formed of a material having a small linear expansion coefficient, such as a super invar or cordierite ceramics.

With reference to FIG. 3, the laser interferometer 203 has an optical fiber 301 transmitting a laser beam from a light source; a collimate lens 302; a polarization beam splitter (PBS) 303; a non-polarization beam splitter (NPBS) 304; a $\lambda/4$ plate 305; a $\lambda/4$ plate 306; a phase meter 307 serving as a displacement detector; and a two-dimensional position detector (2D PSD) 308 serving as a position detector.

With a configuration of the laser interferometer 203 shown in FIG. 3, the amount of change $\Delta L_1$ in the distance $L_1$ from the second retroreflector 205 to the first retroreflector 206 can be measured. Furthermore, a displacement amount and a displacement direction of the first retroreflector 206 in the direction orthogonal to the optical axis Z required for tracking can be detected.

With respect to each configuration component shown in FIG. 3, the optical fiber 301 can be, for example, a polarization-preserving fiber or single-mode fiber. A PBS and a $\lambda/2$ plate may be provided between the collimate lens 302 and the PBS 303. The PBS increases an extinction ratio of the laser output from the optical fiber 301. The λ/2 plate sets a ratio of P polarization intensity and S polarization intensity. For the 2D PSD 308, a quadrant photodiode may be used instead of a two-dimensional position detector. A lens for reducing a beam diameter may be provided between the 2D PSD 308 and the non-polarization beam splitter 304. The phase meter 307 can be, for example, a four-phase meter capable of detecting four phases of Sin θ, −Sin θ, Cos θ, and −Cos θ. Instead of a four-phase meter, a two-phase meter capable of detecting two phases of Sin θ and Cos θ may be used. An optical system for reducing a beam diameter may be provided between the PBS 303 and the phase meter 307.

With reference to FIGS. 3 and 4, a measurement principle is described below with respect to the amount of change ΔL in the distance L from the center C of the reference sphere 201 to the first retroreflector 206 according to the present embodiment.

A laser beam from a laser light source (not shown in the drawings) is directed to the laser interferometer 203 through the optical fiber 301. The laser light source (not shown in the drawings) can be a single wavelength laser light source of 633 nm, for example. The directed laser beam is converted to parallel light by the collimate lens 302. The laser beam converted to the parallel light has p-polarized light and s-polarized light and is divided by the PBS 303 into measurement light and reference light.

The p-polarized light enters the phase meter 307 as is as the reference light. Meanwhile, the s-polarized light is reflected by the PBS 303 and is emitted as the measurement light in the direction of the first retroreflector 206 through the NPBS 304 and the λ/4 plate 305.

The measurement light, which is retroreflected by the first retroreflector 206, passes through the λ/4 plate 305 again. Then, the measurement light is partially reflected by the NPBS 304 and is detected by the 2D PSD 308.

A position of the measurement light detected on the 2D PSD 308 thereby changes depending on the amount and direction of displacement of the first retroreflector 206 when displaced in the direction orthogonal to the optical axis Z. Thus, the data processor 411 obtains the position of the measurement light detected by the 2D PSD 308 and the controller of the data processor 411 drives the elevation angle rotation motor 407 and the azimuth angle rotation motor 408 to rotate the carriage 202 such that the position of the measurement light detected by the 2D PSD 308 is constantly the same. Thereby, the optical axis Z of the measurement light emitted from the laser interferometer 203 can constantly track the first retroreflector 206 again.

Meanwhile, after passing through the λ/4 plate 305 again, the measurement light retroreflected by the first retroreflector 206 partially passes through without being reflected by the NPBS 304, passes through the PBS 303 and the λ/4 plate 306, and is then emitted toward the second retroreflector 205. The measurement light retroreflected by the second retroreflector 205 passes through the λ/4 plate 306 again and is then reflected by the PBS 303 in the direction of the phase meter 307. The measurement light retroreflected by the second retroreflector 205 overlaps the reference light passing through the PBS 303. A phase difference between the measurement light and the reference light is detected by the phase meter 307. The data processor 411 obtains a value of the phase difference and uses the value to calculate the amount of change $\Delta L_1$.

The data processor 411 adds the amount of change $\Delta L_2$ measured by the first displacement gauge 204 and the amount of change $\Delta L_1$ measured by the laser interferometer 203, and thus obtains the amount of change ΔL in the distance L as shown below.

$$\Delta L = \Delta L_1 + \Delta L_2$$

According to the configuration of the present embodiment, the second retroreflector 205 positioned on the same axis as the laser beam is additionally provided on the carriage 202 to measure a relative displacement between the second retroreflector 205 and the first retroreflector 206. Thus, even when the housing of the laser interferometer 203 undergoes thermal expansion, the distance $L_1$ from the second retroreflector 205 to the first retroreflector 206 does not change without being affected. Accordingly, an error due to thermal expansion of the housing of the laser interferometer, which is likely to occur in the conventional method, does not occur. Even when the housing of the laser interferometer 203 undergoes thermal expansion, the amount of change ΔL in the distance can be measured highly accurately.

Furthermore, in the conventional method, a material having a small linear expansion coefficient, such as a super invar or cordierite ceramics, can be considered as a material for the housing of the laser interferometer 203 to reduce an error due to thermal expansion of the housing of the laser interferometer. In contrast, according to the configuration of the present embodiment, a material such as an aluminum alloy or carbon steel, which has a larger linear expansion coefficient than a super invar or the like, can be used as a material for the housing of the laser interferometer 203, thus enabling production using a more inexpensive material. This provides a laser tracking interferometer at a lower price.

Second Embodiment

Figure 5:
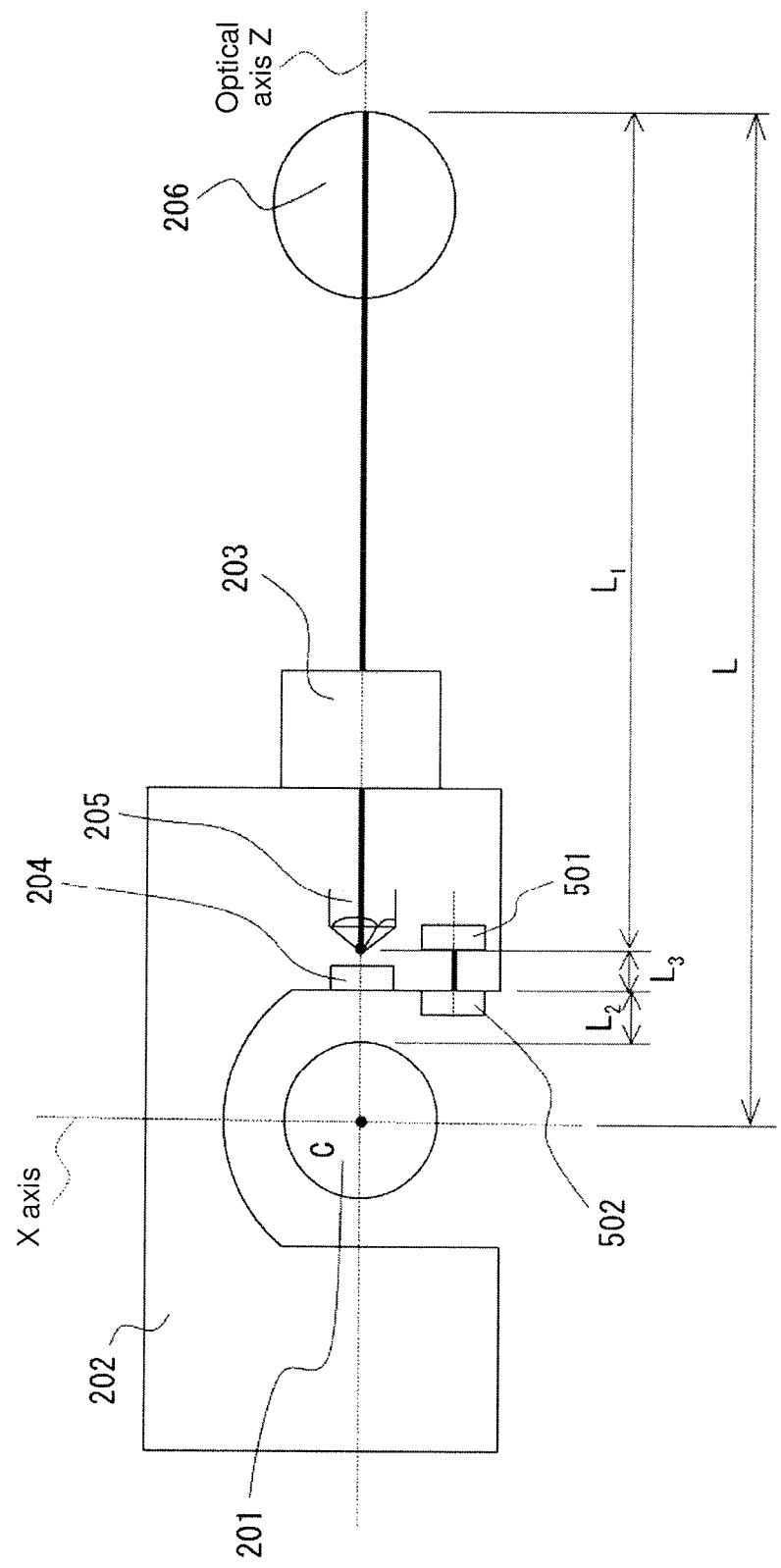
FIG. 5 is a schematic diagram illustrating a configuration of a main portion of a laser tracking interferometer according to a second embodiment of the present disclosure.

FIG. 5 is a schematic diagram illustrating a configuration of a main portion of a laser tracking interferometer according to the present embodiment. In the description below of the present embodiment, components already described are denoted with the same reference numerals and descriptions thereof are omitted or simplified. With reference to FIG. 5, the laser tracking interferometer according to the present embodiment further includes a second displacement gauge 501 and a second displacement gauge target 502, as an exemplary displacement measurer.

The second displacement gauge 501 and the second displacement gauge target 502 are fixated to the carriage 202 with a predetermined distance $L_3$ therebetween. With reference to FIG. 5, the distance $L_3$ is equal to a distance between a reference point of displacement measurement of the first displacement gauge 204 and the second retroreflector 205.

The second displacement gauge 501 outputs a displacement signal associated with a relative displacement from the second displacement gauge target 502. The second displacement gauge 501 is used to measure an amount of change in the distance between the reference point of displacement measurement of the first displacement gauge 204 and the second retroreflector 205.

The second displacement gauge 501 can be a laser interferometric displacement gauge or a capacitance displacement gauge. In the case of using the laser interferometric displacement gauge, for example, as the second displacement gauge 501, the second displacement gauge target 502 can be a plane mirror or a retroreflector, for example. In the case of using the capacitance displacement gauge, for example, as the second displacement gauge 501, the second displacement gauge target 502 can be a block composed of a material having a small linear expansion coefficient, such as a super invar.

With reference to FIG. 5, a measurement principle is described below with respect to the amount of change ΔL in the distance L from the center C of the reference sphere 201 to the first retroreflector 206 according to the present embodiment. The laser interferometer 203 measures the amount of change $\Delta L_1$; the first displacement gauge 204 measures the amount of change $\Delta L_2$; and concurrently, the second displacement gauge 501 measures the amount of change $\Delta L_3$ in the distance $L_3$. The data processor 411 adds the amount of change $\Delta L_2$ measured by the first displacement gauge 204 and the amount of change $\Delta L_1$ measured by the laser interferometer 203, and further adds the amount of change $\Delta L_3$ measured by the second displacement gauge 501. Then, the data processor 411 corrects the amount of change $\Delta L_3$ associated with thermal expansion of the carriage 202 and obtains the amount of change $\Delta L$ in the distance L as shown below.

$$\Delta L = \Delta L_1 + \Delta L_2 + \Delta L_3$$

According to the configuration of the present embodiment, similar to the first embodiment described above, the amount of change $\Delta L_1$ in the distance does not change even when the housing of the laser interferometer 203 undergoes thermal expansion. Thus, an error due to thermal expansion of the housing of the laser interferometer, which occurs in the conventional method, does not occur. Accordingly, even when the housing of the laser interferometer 203 undergoes thermal expansion, the amount of change $\Delta L$ in the distance can be measured highly accurately.

Furthermore, according to the configuration of the present embodiment, the second displacement gauge 501 is additionally provided on the carriage 202 to measure the amount of change in the distance between the reference point of displacement measurement of the first displacement gauge 204 and the second retroreflector 205. This corrects the error $\Delta L_3$ due to thermal expansion of the carriage 202, which is likely to occur in the conventional method. Thus, even when the carriage 202 undergoes thermal expansion, the amount of change $\Delta L$ in the distance can be measured highly accurately.

Third Embodiment

Figure 6:
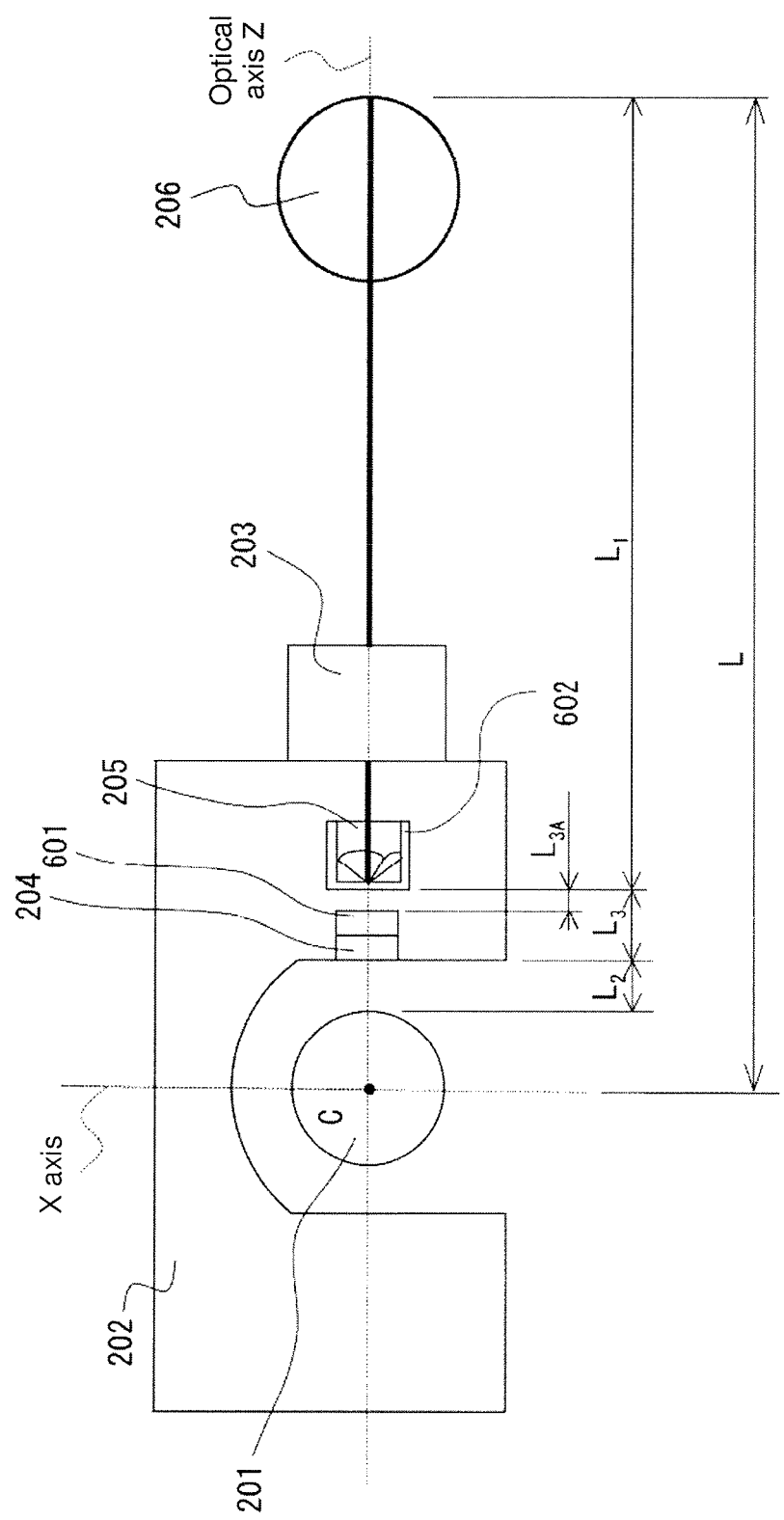
FIG. 6 is a schematic diagram illustrating a configuration of a main portion of a laser tracking interferometer according to a third embodiment of the present disclosure.

FIG. 6 is a schematic diagram illustrating a configuration of a main portion of a laser tracking interferometer according to the present embodiment. In the description below of the present embodiment, components already described are denoted with the same reference numerals and descriptions thereof are omitted or simplified. With reference to FIG. 6, compared to the first embodiment described above, the laser tracking interferometer according to the present embodiment further includes a third displacement gauge 601 and a holder 602, as an alternative exemplary displacement measurer.

The third displacement gauge 601 is provided on the carriage 202 between the first displacement gauge 204 and the second retroreflector 205 and is fixated to a rear surface of the first displacement gauge 204. The holder 602 is fixated to the carriage 202 so as to cover a front surface of the second retroreflector 205 which is opposite to the third displacement gauge 601. The holder 602 has a planar rear surface. The second retroreflector 205 is fixated to the carriage 202 through the holder 602. In a case where the second retroreflector 205 has a spherical structure, the present embodiment can be achieved without the holder 602.

The third displacement gauge 601 and the holder 602 are fixated to the carriage 202 with a predetermined distance $L_{3A}$ therebetween. With reference to FIG. 6, the distance $L_{3A}$ is a distance between a reference point of displacement measurement of the third displacement gauge 601 and a front surface of the holder 602.

The third displacement gauge 601 outputs a displacement signal associated with a relative displacement from the second retroreflector 205 (holder 602). The third displacement gauge 601 is used to measure an amount of change $\Delta L_{3A}$, which is a portion of the amount of change in the distance between the reference point of displacement measurement of the first displacement gauge 204 and the second retroreflector 205.

The third displacement gauge 601 can be a laser interferometric displacement gauge or a capacitance displacement gauge. The holder 602 can be formed of a super invar having a small linear expansion coefficient.

With reference to FIG. 6, a measurement principle is described below with respect to the amount of change $\Delta L$ in the distance L from the center C of the reference sphere 201 to the first retroreflector 206 according to the present embodiment. The laser interferometer 203 measures the amount of change $\Delta L_1$; the first displacement gauge 204 measures the amount of change $\Delta L_2$; and concurrently, the third displacement gauge 601 measures the amount of change $\Delta L_{3A}$, which is a portion of the amount of change $\Delta L_3$ in the distance $L_3$. The data processor 411 adds the amount of change $\Delta L_2$ measured by the first displacement gauge 204 and the amount of change $\Delta L_1$ measured by the laser interferometer 203, and further adds the amount of change $\Delta L_{3A}$ measured by the third displacement gauge 601. Then, the data processor 411 corrects the amount of change $\Delta L_{3A}$, which is a portion of the amount of change $\Delta L_3$ in the distance $L_3$ associated with thermal expansion of the carriage 202, and obtains the amount of change $\Delta L$ in the distance L as shown below.

$$\Delta L = \Delta L_1 + \Delta L_2 + \Delta L_{3A}$$

According to the configuration of the present embodiment, similar to the first embodiment described above, the amount of change $\Delta L_1$ in the distance does not change even when the housing of the laser interferometer 203 undergoes thermal expansion. Thus, an error due to thermal expansion of the housing of the laser interferometer, which occurs in the conventional method, does not occur. Accordingly, even when the housing of the laser interferometer 203 undergoes thermal expansion, the amount of change $\Delta L$ in the distance can be measured highly accurately.

Furthermore, according to the configuration of the present embodiment, the third displacement gauge 601 is additionally provided on the carriage 202 to measure a portion of the amount of change in the distance between the reference point of displacement measurement of the first displacement gauge 204 and the second retroreflector 205. This corrects the amount of change $\Delta L_{3A}$, which is a portion of the error $\Delta L_3$ due to thermal expansion of the carriage 202, the error being likely to occur in the conventional method. Thus, even when the carriage 202 undergoes thermal expansion, the amount of change $\Delta L$ in the distance can be measured highly accurately.

Furthermore, using measurement values of the amounts of change $\Delta L_1$, $\Delta L_2$, and $\Delta L_3$, and a value of the distance $L_3$ and a value of the distance $L_{3A}$, which are measured in advance, the amount of change $\Delta L$ can also be obtained as below to correct thermal expansion of the carriage 202.

[Expression 1]

$$\Delta L = \Delta L_1 + \Delta L_2 + \frac{L_3}{L_{3A}} \Delta L_{3A} \tag{1}$$

Fourth Embodiment

Figure 7:
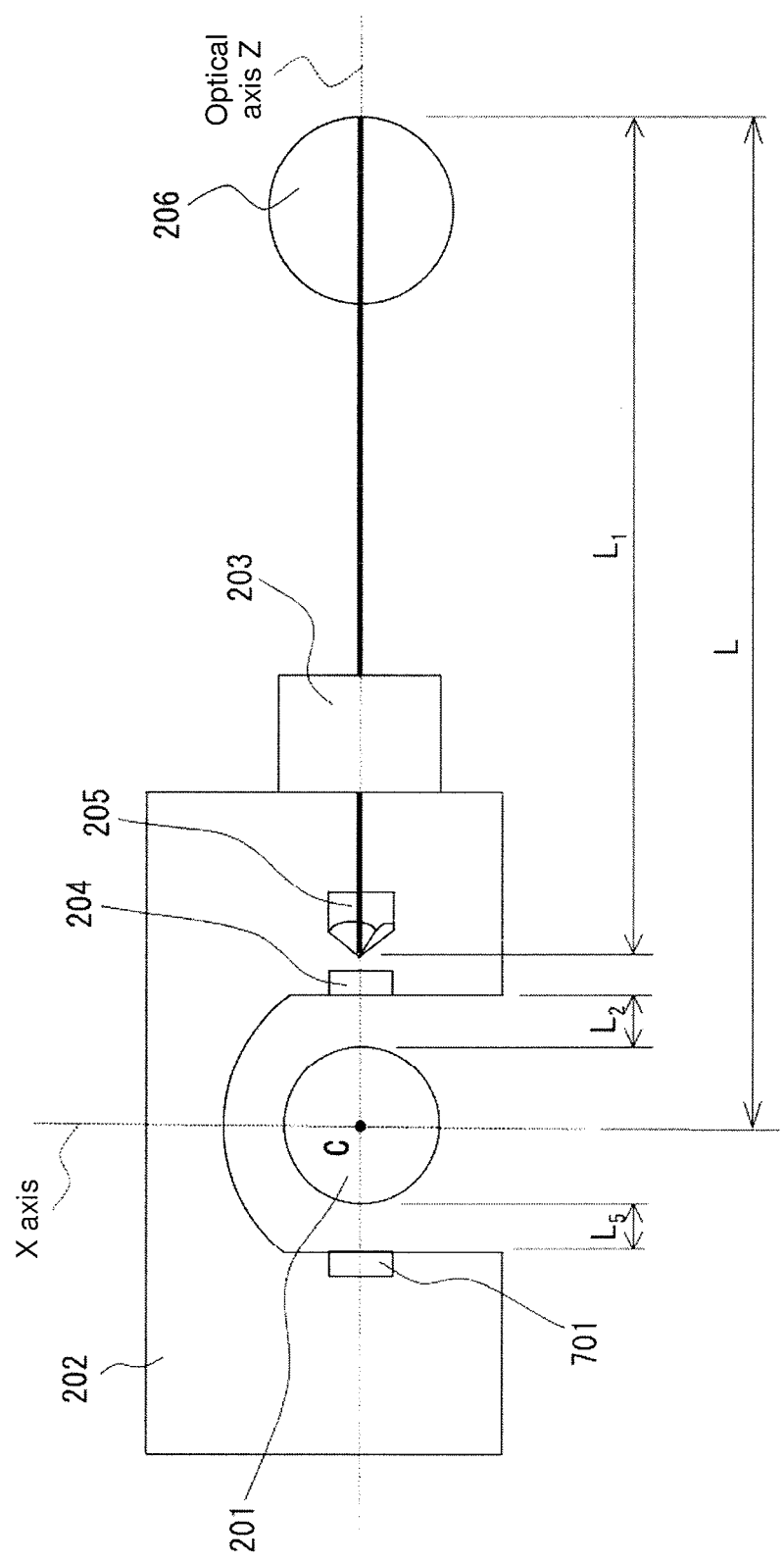
FIG. 7 is a schematic diagram illustrating a configuration of a main portion of a laser tracking interferometer according to a fourth embodiment of the present disclosure.

FIG. 7 is a schematic diagram illustrating a configuration of a main portion of a laser tracking interferometer according to the present embodiment. In the description below of the present embodiment, components already described are denoted with the same reference numerals and descriptions thereof are omitted or simplified. With reference to FIG. 7, compared to the first embodiment described above, the laser tracking interferometer according to the present embodiment further includes a fourth displacement gauge 701.

The fourth displacement gauge 701 is fixated on the carriage 202 so as to be on the same axis as the laser beam and opposite to the first displacement gauge 204 with the reference sphere 201 therebetween.

The fourth displacement gauge 701 outputs a displacement signal associated with a relative displacement between the reference sphere 201 and the fourth displacement gauge 701. Specifically, the fourth displacement gauge 701 is used to measure an amount of change $\Delta L_5$ in a distance $L_5$ from the surface of the reference sphere 201 to the fourth displacement gauge 701 associated with rotation of the carriage 202. Measuring the amount of change $\Delta L_5$ allows correction of thermal expansion of the reference sphere 201. The fourth displacement gauge 701 can be a capacitance displacement gauge or an eddy current displacement gauge.

With reference to FIG. 7, a measurement principle is described below with respect to the amount of change $\Delta L$ in the distance L from the center C of the reference sphere 201 to the first retroreflector 206 according to the present embodiment. The laser interferometer 203 measures the amount of change $\Delta L_1$; the first displacement gauge 204 measures the amount of change $\Delta L_2$; and concurrently, the fourth displacement gauge 701 measures the amount of change $\Delta L_5$ in the distance $L_5$. The data processor 411 adds the amount of change $\Delta L_2$ measured by the first displacement gauge 204 and the amount of change $\Delta L_1$ measured by the laser interferometer 203, and further adds the amount of change $\Delta L_5$ measured by the fourth displacement gauge 701. Then, the data processor 411 corrects the amount of change $\Delta L_5$ associated with thermal expansion of the reference sphere 201 and obtains the amount of change $\Delta L$ in the distance L as shown below.

[Expression 2]

$$\Delta L = \Delta L_1 + \frac{\Delta L_2 - \Delta L_5}{2} \quad (2)$$

According to the configuration of the present embodiment, similar to the first embodiment described above, the amount of change $\Delta L_1$ in the distance does not change even when the housing of the laser interferometer 203 undergoes thermal expansion. Thus, an error due to thermal expansion of the housing of the laser interferometer, which occurs in the conventional method, does not occur. Accordingly, even when the housing of the laser interferometer 203 undergoes thermal expansion, the amount of change $\Delta L$ in the distance can be measured highly accurately.

Furthermore, according to the configuration of the present embodiment, a material such as an aluminum alloy or carbon steel, which has a larger linear expansion coefficient than a super invar or the like, can be used as a material for the housing of the laser interferometer 203, thus enabling production using a more inexpensive material. This provides a laser tracking interferometer at a lower price.

Furthermore, according to the configuration of the present embodiment, the fourth displacement gauge 701 is additionally provided on the carriage 202 to measure the relative displacement between the reference sphere 201 and the fourth displacement gauge 701. When the reference sphere 201 undergoes thermal expansion evenly from the center C, the thermal expansion of the reference sphere 201 can be compensated. Thus, the amount of change in the distance can be measured highly accurately.

The present invention is not limited to the embodiments described above and may be modified appropriately within a range not deviating from the concept.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A laser tracking interferometer for detecting a displacement of a first retroreflector by utilizing interference of a laser beam emitted toward the first retroreflector as a measured body and reflected by the first retroreflector in a return direction, the laser tracking interferometer performing tracking by using a positional change of an optical axis of the laser beam, the laser tracking interferometer comprising:
a reference sphere fixed in place;
a carriage having a first displacement gauge configured to output a displacement signal associated with a relative displacement between the first displacement gauge and the reference sphere;
a second retroreflector provided on the carriage;
a laser interferometer configured to output a displacement signal associated with a relative displacement between the first retroreflector and the second retroreflector;
a displacement measurer provided on the carriage and configured to measure an amount of change in a distance between the first displacement gauge and the second retroreflector; and
a data processor configured to calculate a displacement of the first retroreflector with reference to the reference sphere based on the displacement signal output from the first displacement gauge, the displacement signal output from the laser interferometer, and the amount of change measured by the displacement measurer.

2. The laser tracking interferometer according to claim 1, wherein the displacement measurer comprises:
a target; and
a second displacement gauge positioned from the target at a distance between the first displacement gauge and the second retroreflector, the second displacement gauge configure to output a displacement signal associated with a relative displacement between the second displacement gauge and the target.

3. The laser tracking interferometer according to claim 1, wherein the displacement measurer further comprises a third displacement gauge positioned between the first displacement gauge and the second retroreflector, the third displacement gauge configured to output a displacement signal associated with a relative displacement between the third displacement gauge and the second retroreflector.

4. The laser tracking interferometer according to claim 3, wherein the displacement measurer further comprises a holder covering a front surface of the second retroreflector.

5. The laser tracking interferometer according to claim 1, further comprising an additional displacement gauge provided on the carriage at a position opposite the first displacement gauge with the reference sphere therebetween, the additional displacement gauge configured to output a displacement signal associated with a relative displacement between the additional displacement gauge and the reference sphere, wherein the data processor is further configured to calculate a displacement of the first retroreflector with reference to the reference sphere based on the displacement signal output from the first displacement gauge, the displacement signal output from the laser interferometer, and the displacement signal output from the additional displacement gauge.

6. The laser tracking interferometer according to claim 1, further comprising an additional displacement gauge provided on the carriage at a position opposite the first displacement gauge with the reference sphere therebetween, the additional displacement gauge configured to output a displacement signal associated with a relative displacement between the additional displacement gauge and the reference sphere, wherein the data processor is further configured to calculate a displacement of the first retroreflector with reference to the reference sphere based on the displacement signal output from the first displacement gauge, the displacement signal output from the laser interferometer, and the displacement signal output from the additional displacement gauge.

7. The laser tracking interferometer according to claim 2, further comprising an additional displacement gauge provided on the carriage at a position opposite the first displacement gauge with the reference sphere therebetween, the additional displacement gauge configured to output a displacement signal associated with a relative displacement between the additional displacement gauge and the reference sphere, wherein the data processor is further configured to calculate a displacement of the first retroreflector with reference to the reference sphere based on the displacement signal output from the first displacement gauge, the displacement signal output from the laser interferometer, and the displacement signal output from the additional displacement gauge.

8. The laser tracking interferometer according to claim 3, further comprising a fourth displacement gauge provided on the carriage at a position opposite the first displacement gauge with the reference sphere therebetween, the fourth displacement gauge configured to output a displacement signal associated with a relative displacement between the fourth displacement gauge and the reference sphere, wherein the data processor is further configured to calculate a displacement of the first retroreflector with reference to the reference sphere based on the displacement signal output from the first displacement gauge, the displacement signal output from the laser interferometer, and the displacement signal output from the fourth displacement gauge.

9. The laser tracking interferometer according to claim 4, further comprising a fourth displacement gauge provided on the carriage at a position opposite the first displacement gauge with the reference sphere therebetween, the fourth displacement gauge configured to output a displacement signal associated with a relative displacement between the fourth displacement gauge and the reference sphere, wherein the data processor is further configured to calculate a displacement of the first retroreflector with reference to the reference sphere based on the displacement signal output from the first displacement gauge, the displacement signal output from the laser interferometer, and the displacement signal output from the fourth displacement gauge.

10. The laser tracking interferometer according to claim 1, further comprising:
a position detector configured to output a position signal associated with an amount of misalignment of the laser beam reflected by the first retroreflector and returning to the laser interferometer when the laser beam is misaligned in a direction orthogonal to the optical axis thereof; and
a controller configured to control, based on the position signal from the position detector, rotation of the carriage such that the amount of misalignment is zero.

11. The laser tracking interferometer according to claim 1, further comprising:
a position detector configured to output a position signal associated with an amount of misalignment of the laser beam reflected by the first retroreflector and returning to the laser interferometer when the laser beam is misaligned in a direction orthogonal to the optical axis thereof; and
a controller configured to control, based on the position signal from the position detector, rotation of the carriage such that the amount of misalignment is zero.

12. The laser tracking interferometer according to claim 2, further comprising:
a position detector configured to output a position signal associated with an amount of misalignment of the laser beam reflected by the first retroreflector and returning to the laser interferometer when the laser beam is misaligned in a direction orthogonal to the optical axis thereof; and
a controller configured to control, based on the position signal from the position detector, rotation of the carriage such that the amount of misalignment is zero.

13. The laser tracking interferometer according to claim 3, further comprising:
a position detector configured to output a position signal associated with an amount of misalignment of the laser beam reflected by the first retroreflector and returning to the laser interferometer when the laser beam is misaligned in a direction orthogonal to the optical axis thereof; and
a controller configured to control, based on the position signal from the position detector, rotation of the carriage such that the amount of misalignment is zero.

14. The laser tracking interferometer according to claim 4, further comprising:
a position detector configured to output a position signal associated with an amount of misalignment of the laser beam reflected by the first retroreflector and returning to the laser interferometer when the laser beam is misaligned in a direction orthogonal to the optical axis thereof; and
a controller configured to control, based on the position signal from the position detector, rotation of the carriage such that the amount of misalignment is zero.

15. The laser tracking interferometer according to claim 5, further comprising:
a position detector configured to output a position signal associated with an amount of misalignment of the laser beam reflected by the first retroreflector and returning to the laser interferometer when the laser beam is misaligned in a direction orthogonal to the optical axis thereof; and a controller configured to control, based on the position signal from the position detector, rotation of the carriage such that the amount of misalignment is zero.

16. The laser tracking interferometer according to claim 6, further comprising:
    a position detector configured to output a position signal associated with an amount of misalignment of the laser beam reflected by the first retroreflector and returning to the laser interferometer when the laser beam is misaligned in a direction orthogonal to the optical axis thereof; and
    a controller configured to control, based on the position signal from the position detector, rotation of the carriage such that the amount of misalignment is zero.

17. The laser tracking interferometer according to claim 7, further comprising:
    a position detector configured to output a position signal associated with an amount of misalignment of the laser beam reflected by the first retroreflector and returning to the laser interferometer when the laser beam is misaligned in a direction orthogonal to the optical axis thereof; and
    a controller configured to control, based on the position signal from the position detector, rotation of the carriage such that the amount of misalignment is zero.

18. The laser tracking interferometer according to claim 8, further comprising:
    a position detector configured to output a position signal associated with an amount of misalignment of the laser beam reflected by the first retroreflector and returning to the laser interferometer when the laser beam is misaligned in a direction orthogonal to the optical axis thereof; and
    a controller configured to control, based on the position signal from the position detector, rotation of the carriage such that the amount of misalignment is zero.

19. The laser tracking interferometer according to claim 9, further comprising:
    a position detector configured to output a position signal associated with an amount of misalignment of the laser beam reflected by the first retroreflector and returning to the laser interferometer when the laser beam is misaligned in a direction orthogonal to the optical axis thereof; and
    a controller configured to control, based on the position signal from the position detector, rotation of the carriage such that the amount of misalignment is zero.

* * * * *